United States Patent [19]

Doremus

[11] Patent Number: 5,474,165
[45] Date of Patent: Dec. 12, 1995

[54] DECLUTCHING DEVICE HAVING AN HYDRAULIC ACTUATOR, ESPECIALLY FOR A CLUTCH OF THE PULL-OFF TYPE

[75] Inventor: Olivier Doremus, Noyelle Vion, France

[73] Assignee: Valeo, Paris, Cedex, France

[21] Appl. No.: 187,893

[22] Filed: Jan. 28, 1994

[30] Foreign Application Priority Data

Jan. 29, 1993 [FR] France ................. 93 00933

[51] Int. Cl.⁶ .............. F16D 25/08; F16D 25/12
[52] U.S. Cl. ............. 192/85 CA; 192/85 C; 192/98; 192/110 B
[58] Field of Search ............ 192/85 CA, 85 C, 192/98, 89.24, 110 B, 101

[56] References Cited

U.S. PATENT DOCUMENTS

| | | | |
|---|---|---|---|
| 4,456,111 | 6/1984 | Limbacher | 192/85 CA |
| 4,609,087 | 9/1986 | Shirley | 192/85 CA |
| 4,915,202 | 4/1990 | Leigh-Monstevens et al. | 192/85 CA |

FOREIGN PATENT DOCUMENTS

| | | |
|---|---|---|
| 0310733 | 4/1989 | European Pat. Off. . |
| 81764 | 9/1963 | France . |
| 3205155 | 8/1983 | Germany . |
| 60-78120 | 5/1985 | Japan ................. 192/85 CA |
| 61-62626 | 3/1986 | Japan ................. 192/85 CA |
| 2245329 | 1/1992 | United Kingdom ......... 192/85 CA |
| 2256907 | 12/1992 | United Kingdom . |

Primary Examiner—Andrea L. Pitts
Attorney, Agent, or Firm—Longacre & White

[57] ABSTRACT

A declutching device, especially for a motor vehicle clutch of the pull-off type, comprises an hydraulic actuator. The latter comprises a fixed member and a movable member in piston and cylinder relationship, defining a control chamber between them, together with preloading force for biassing the movable member of the hydraulic actuator permanently towards one of its end positions with respect to the fixed member of the actuator. The supply of hydraulic fluid to the control chamber is under the control of a valve, which is for example incorporated in a boss which is part of the fixed member of the hydraulic actuator. The valve has a movable valve member which is in communication with the control chamber on one side, and which is biassed by a spring on the opposite side of the valve member.

5 Claims, 1 Drawing Sheet

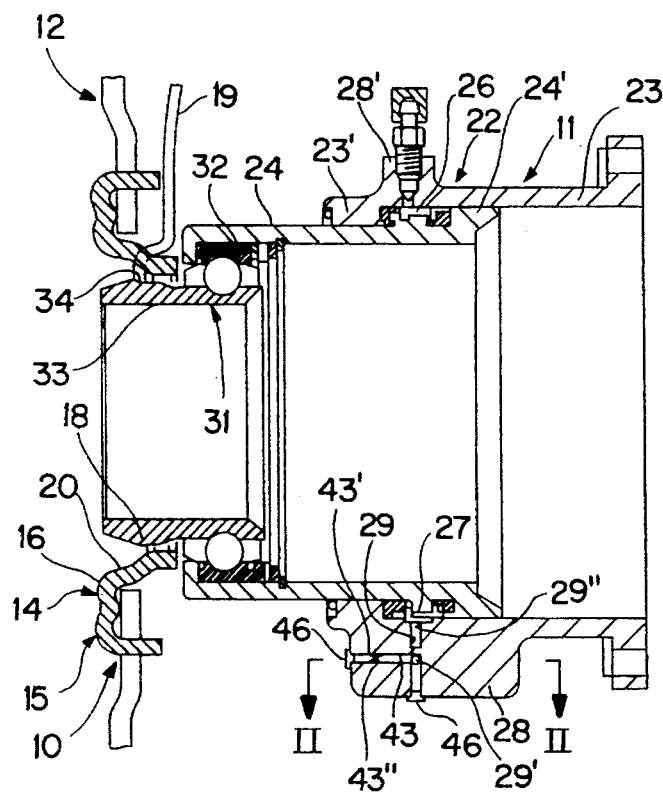
FIG. 1
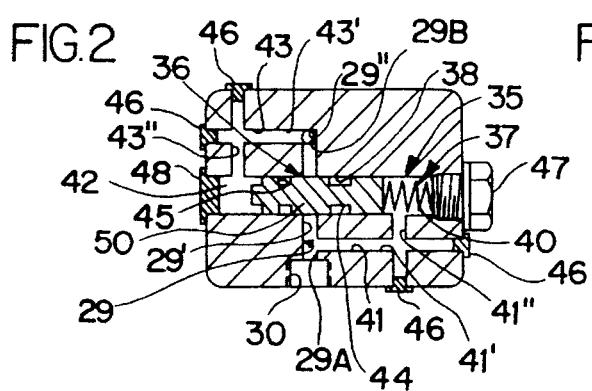
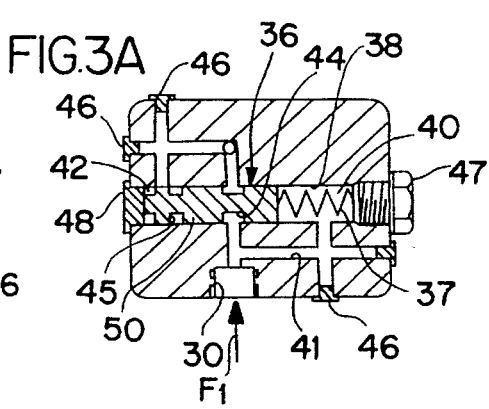
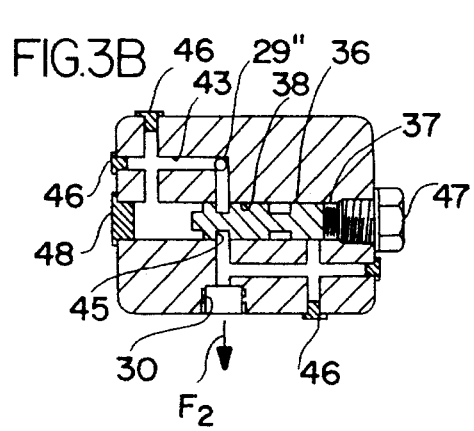
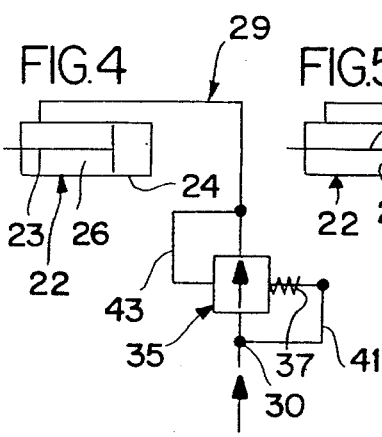
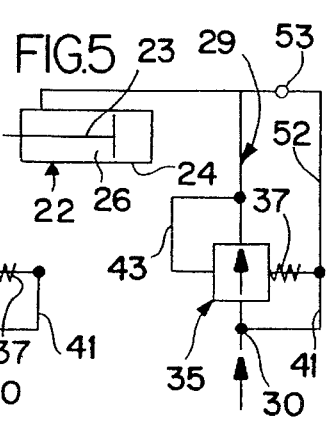

5,474,165

DECLUTCHING DEVICE HAVING AN HYDRAULIC ACTUATOR, ESPECIALLY FOR A CLUTCH OF THE PULL-OFF TYPE

FIELD OF THE INVENTION

This invention, in general terms, relates to declutching devices of the kind comprising an hydraulic actuator, which itself comprises two members disposed in piston and cylinder relationship, namely a fixed member and a movable member defining a control chamber between them, together with preloading means which permanently bias the said movable member of the hydraulic actuator towards one of its end positions with respect to the said fixed member.

BACKGROUND OF THE INVENTION

In a declutching device of the general kind defined above, the preloading means develop an axial force of the order of 15 to 30 kilograms for example. The purpose of these preloading means is to maintain the clutch release bearing which is carried by the movable member of the declutching device in contact with the declutching means of the clutch itself. In this way, any play, and therefore any delay in operation, is avoided during declutching. The clutch release bearing conventionally comprises a rolling bearing which, having regard to the action of the preloading means, is put in permanent rotation: this is beneficial to its useful life. When the action of the clutch release bearing on the declutching means of the clutch is obtained through a thrust means, carried by the declutching means (such as a diaphragm) of the clutch and engaged with the clutch release bearing (as is the case, in particular, where the clutch is of the pull-off type), all play or clearance is avoided between the various components involved. This again improves the useful life of the components because it reduces the possibility of wear.

At the present time it is usual for these preloading means to consist of a spring, typically of the coil spring type, which bears at one end on the base of an annular cup which is mounted axially on the fixed member of the hydraulic actuator, with the coil spring bearing at its other end on the base of another annular cup which is mounted axially on the movable member of the actuator. In that case, the preloading force inevitably varies with the degree of extension of the spring, and therefore with the amount of wear occurring in the friction liners of the clutch.

Then, even if some reserve of precharging force is designed into the system when the latter is new, in order to compensate for this wear in advance, it is not certain that during operation the preloading force will not become reduced below the minimum threshold value which is required in order to ensure that the required contact will always be guaranteed between the clutch release bearing and the declutching means of the clutch.

In addition, the need to provide the preloading spring and the above mentioned annular cups means that these additional components complicate both the design and the size of the declutching device.

In order to overcome these drawbacks it has been proposed to provide the preloading force hydraulically, with the aid of a pump which maintains a predetermined pressure in the control chamber of the hydraulic actuator. However, the provision of such a pump cannot fail to increase the cost of the declutching device.

DISCUSSION OF THE INVENTION

An object of the present invention is to provide a declutching device of the general kind defined in "Field of the Invention" above, and in which an adequate preloading force is ensured hydraulically without the need to provide any kind of pump whatever, this being achieved by taking advantage in a particularly simple way of the supply of hydraulic oil to the control chamber of the hydraulic actuator, in any way required for the operation of the latter.

According to the invention, a declutching device, of the kind comprising an hydraulic actuator which itself comprises two members disposed in piston and cylinder relationship, namely a fixed member and a movable member, defining a control chamber between them, together with preloading means which permanently bias the said movable member of the hydraulic actuator towards one of its extreme positions with respect to the said fixed member, is characterised in that the supply of hydraulic fluid to the said control chamber is under the control of a valve having a movable valve member and resilient means, the latter being disposed on the opposite side of the said valve member from the said control chamber and acting on the said valve member.

For example, and according to a preferred feature of the invention, the said valve is formed with a bore which, in a middle portion thereof, intersects a main duct which connects a hydraulic fluid inlet to the said control chamber, with a first end of the bore being connected directly through a branch duct to the said inlet, a second end of the bore being connected directly through a second branch duct to the control chamber, the said movable valve member being a slide valve mounted for sealed sliding movement in the said bore, the slide valve having at least one transverse recess for establishing communication between the two portions of the main duct separated by the said bore, the said resilient means being arranged to bias the valve member towards that one of the ends of the said bore which is connected to the inlet.

Whatever the arrangement of the clutch itself, under the biassing action of the declutching means (e.g. diaphragm) of the clutch, a residual pressure subsists in the control chamber of the hydraulic actuator due to the movable valve member of the valve which is provided in accordance with the invention, and this residual pressure provides the required preloading force. The value of this force depends on the resilient means acting on the movable valve member, and these resilient means are therefore appropriately calibrated for this purpose.

Another advantage of the invention is that the preloading force obtained in this way is independent of the degree of wear in the friction liners of the clutch. A further advantage is that it is also independent of temperature and, in particular, of the temperature of the hydraulic fluid.

The design of the declutching device in accordance with the invention is also simplified, in that it is free of any spring.

Finally, if desired, and according to a further preferred feature of the invention, the said valve is incorporated in the fixed member of the hydraulic actuator.

The various features and advantages of the invention will appear more clearly on a reading of the description of preferred embodiments which follows, and which is given by way of example only and with reference to the accompanying diagrammatic drawings.

BRIEF DESCRIPTION OF THE DRAWINGS

FIG. 1 is a view in axial cross section of a declutching device in accordance with the invention.

FIG. 2, on a larger scale, is a view of part of the same declutching device, shown in longitudinal cross section taken on the line II—II in FIG. 1

FIGS. 3A and 3B are views similar to FIG. 2, but show two successive stages in the operation of the valve which is employed in this declutching device.

FIG. 4 is a circuit diagram showing the hydraulic system.

FIG. 5 is another circuit diagram, similar to FIG. 4 but illustrating a modified embodiment of the invention.

DESCRIPTION OF PREFERRED EMBODIMENTS OF THE INVENTION

The drawings show, by way of example, the application of the invention to the control of a clutch 10 of the pull-off type. The clutch 10 is controlled by a declutching device 11, which in the present case is snap-fitted on to the declutching means 12 of the clutch. In this example the declutching means 12 is a diaphragm, which is equipped with thrust means 14. The thrust means 14 in the present case includes, in a known manner, a thrust element 15 which has a corrugated or beaded portion 16 bearing on the declutching means 12 on the side of the latter opposite to the declutching device 11. The thrust means 14 also, and again in known manner, includes a coupling member 18 by means of which the declutching device 11 is enabled to exert a tractive force on the thrust element 15. The coupling member 18 in this example consists of a ring having a gap such that the ring is open and discontinuous, being extended by a pair of generally radial arms 19 extending on either side of the gap. The ring 18 is resiliently deformable radially, and bears on a generally frusto-conical portion 20 of the thrust element 15, on the side of the latter opposite to the declutching device 11. For more detail regarding the thrust means 14, reference is invited for example to U.S. patent specification No. 5,113,989 or the corresponding French published patent specification FR 2 653 195A.

Where the clutch 10 is a motor vehicle clutch, it forms, with the engine of the vehicle, a first unit, while the declutching device 11, together with the gearbox of the vehicle, constitute a second unit. During assembly of the vehicle, relative axial movement is effected between these two units, so as to bring them together so that they are finally coupled together through the required snap-fitting action between the declutching device 11 and the clutch 10.

The declutching device 11 essentially comprises an hydraulic actuator 22 and preloading means 27. The hydraulic actuator 22 comprises two coaxial members 23 and 24 which are mounted in piston and cylinder relationship with each other, with one of these members being fixed and the other movable. The actuator members 23 and 24 have respective radial flanges 23' and 24' at their respective opposed axial ends. Between these two flanges the members 23 and 24 define a control chamber 26 between them.

In the present example, the member 23 is the fixed member, and the member 24 is the movable member. The movable member 24 is permanently biassed towards one of its end positions with respect to the fixed member by the preloading means 27. In the present case, having regard to the fact that the clutch 10 is of the pull-off type, the position of the movable member 24 to which the latter is thus biassed is the position in which it is retracted into the fixed member 23,. i.e. towards the right in FIG. 1.

In the present example (and as shown in FIG. 1), it is the fixed member 23 of the hydraulic actuator 22 which lies radially outward of the movable member 24, with its radial flange 23' extending radially inwards towards the axis of the control chamber 26. The hydraulic actuator 22 is secured to the casing of the gearbox by means of a radial flange at the rear end of the member 23, which is visible in FIG. 1.

The fixed member 23 of the actuator has at least one boss 28, 28', to accommodate at least one hydraulic connection for the supply of hydraulic fluid to the control chamber 26. In the present example there are two of these bosses, comprising a feed boss 28 and a purge boss 28'. In the feed boss 28, a main duct 29 connects the control chamber 26 to an inlet 30 (see FIG. 2).

For convenience of construction, the main duct 29 in this example consists of two bores 29' and 29" arranged at right angles to each other. The bore 29' extends from a hydraulic fluid inlet 30 in a direction which is substantially tangential to a circumference of the assembly (i.e. to the outer periphery of the feed boss 28). The bore 29" extends substantially radially with respect to the axis of the assembly, and connects the bore 29' to the control chamber 26. A clutch release bearing 31 is coupled to the movable member 24 of the hydraulic actuator 22. In the present example the clutch release bearing 31 comprises a ball bearing having an outer ring 32 and an inner ring. The outer ring 32 is mounted axially on the movable member 24, with automatic centering means having an axial spring in a known manner, as can be seen in FIG. 1. The inner ring of the bearing is appropriately extended axially so as to define an actuating element 33. An annular transverse thrust shoulder 34 is formed on the outer periphery of the actuating element 33, and the coupling member 18 of the thrust means 14 of the clutch is in hooked engagement against the shoulder 34.

The control chamber 26 is supplied with hydraulic fluid under the control of a valve 35 which is best seen in FIG. 2. The valve 35 has a movable valve member 36 which is loaded by resilient means 37 on the side of the valve member remote from the control chamber 26. In this particular example, the valve 35 is incorporated in the fixed member 23 of the hydraulic actuator 22, and more precisely within the feed boss 28, which constitutes a body of the valve.

In the form shown in the drawings, the valve 35 has a bore 38 which, in its central part, intersects the main duct 29 that joins the inlet 30 to the control chamber 26. One end 40 of the bore 38 is connected directly to the inlet 30 through the branch duct 41, while its other end 42 is itself connected directly through a further branch duct 43 to the control chamber 26. The movable valve member 36 is in the form of a slide valve which, being mounted for sealed sliding movement within the bore 38, has at least one transverse recess 44, 45. The two portions 29A and 29B of the main duct 29, which are separated from each other by the bore 38, are able to be brought into communication with each other through these recesses 44 and/or 45. As can be seen in FIG. 2, the resilient means 37 join the slide valve 36 to that one of the ends of the bore 36 that is in communication with the inlet 30, i.e. the end 40.

It should be noted at this point that the term "recess" is to be interpreted here in a broad sense. It simply means that, at the location concerned, the slide valve which constitutes the movable valve member 36 leaves a free passage between the inlet 30 and the control chamber 26 or vice versa.

In the present example, the bore 38 intersects the bore 29' of the main duct 29 transversely between the inlet 30 and its bore 29", in such a way that the portion 29A of the main duct 29 consists of that portion of the bore 29' which extends from the inlet 30 to the bore 38, while its portion 29B is constituted, firstly by the remaining portion of the bore 29' between the bore 38 and the bore 29", and secondly this latter bore 29". For ease of construction, the branch duct 41 in this example is itself also constituted by two bores 41' and 41", which are at right angles to each other. The first of these bores 41' extends from the bore 29', and the second one, 41", is open into the bore 38; while similarly, the branch duct 43 consists of two bores 43' and 43", again arranged at right angles to each other, with the first of these bores 43' extending from the bore 29", and the second bore 43" being open into the bore 38.

In each of the various bores with which the feed boss 28 is thus formed, the inactive end of the bore concerned is closed off by means of a suitable closure member 46. Similarly, the end 40 of the bore 38 is closed by a plug 47, which in this example is a threaded plug on which the resilient means 37 are engaged. The end 42 of the bore 38 is closed by a further closure member, or plug, 48. Like the bore 38, the slide valve constituting the movable valve member 38 of the valve 35 is of circular transverse cross section. In the present example the number of recesses 44, 45 is two, these being spaced away from each other, with each of these recesses being here in the form of an annular peripheral groove. The resilient means of the valve 35 in this example consist of a simple spring of the coil spring type, which, being engaged on the plug 47 as mentioned above, also bears axially on the slide valve 36. It will also be noted from FIG. 2 that the fluid inlet 30 is in the form of a threaded bore. A suitable connector is threaded into this bore, this connector having a tubular connection by which it is connected in any suitable way to a supply cylinder for hydraulic fluid (oil) under pressure. The connecter and oil supply cylinder are not shown in the drawings.

When the clutch 10 is engaged, that is to say when this clutch 10 is in its torque transmitting configuration, the movable member 24 of the hydraulic actuator 22 is in its extended position as shown in FIG. 1, and the control chamber 26 is depressurised. For reasons which will appear later on in this description, the slide valve constituting the movable valve member 36 of the valve 35 is then in a position such that it covers the main duct 29 with its solid portion 50, which lies intermediate between the two annular grooves 44 and 45. FIG. 2 shows the valve member in this position.

For declutching, oil under pressure is delivered to the fluid inlet 30 from the supply cylinder mentioned above. This oil passes through the branch duct 41 to the end 40 of the bore 38, so as to drive the slide valve 36 towards the other end 42 of the bore 38. During this displacement of the slide valve, its annular groove 44 restores the continuity of the main duct 29 as seen in FIG. 3A, so that the pressurised oil reaches the control chamber 26 as indicated by the arrow F1 in FIG. 3A. The oil pressure in the control chamber 26 accordingly drives the movable member 24 of the actuator 22 to its retracted position (i.e. displaces it to the right in FIG. 1), so that the clutch release bearing 31 exerts a tractive force on the diaphragm 12 to disengage the clutch.

In order to re-engage the clutch, oil pressure is caused to fall at the inlet 30, so that under the influence of the pressure prevailing in the control chamber 26, which is reinforced by the axial force then exerted on the movable member 24 of the hydraulic actuator 22 by the diaphragm 12 of the clutch, the valve member 36 of the valve 35 is caused to be displaced towards the rear end 40 of the bore 38 against the action of the spring 37, so as to reach the position shown in FIG. 3B. As can be seen from this Figure, the annular groove 45 in the slide valve 36 now maintains continuity between the two portions of the main duct 29, so that the pressurised oil from the control chamber 26 can now flow in the reverse direction towards the inlet 30 as indicated by the arrow F2 in FIG. 3B. The oil then returns to the oil supply cylinder.

At the same time, the pressure in the control chamber 26 is also applied to the slide valve 36 through the branch duct 43, on the left hand end of the slide valve as seen in drawings, i.e. the end of the latter remote from the spring 37. When this pressure balances the axial force developed by the spring 37, the slide valve 36 is in the middle or intermediate declutching position in which, as explained above, its solid portion 50 blocks the main duct 29. There is then some residual pressure in the control chamber 26, and it is this residual pressure that provides the required preloading force. It will of course be realized that this residual pressure can be adjusted by appropriate calibration of the spring 37. To this end, the threaded plug 47 can be adjusted by screwing it in or out of the bore 38.

In the modified embodiment of the invention indicated diagrammatically in FIG. 5, a branch duct 52, controlled by a non-return valve 53, connects the control chamber 26 directly to the fluid inlet 30, for one direction of flow of the oil going from the inlet 30 to the control chamber 26. This protects the system against any possible delay in declutching.

The present invention is of course not limited to the embodiments described above and shown in the drawings, but embraces all possible modifications, especially as regards the structure, location and/or fitting of the valve employed in the apparatus.

In addition, having regard to the broad interpretation that is to be given to the word "recess" as mentioned above, at least one of these "recesses" in the slide valve that constitutes the movable valve member of the valve employed in the system may be omitted, by so profiling the valve member at the appropriate end of the latter, and over a large enough length, to leave a free passage for flow of oil in the axial position of the valve member where this is required.

What is claimed is:

1. A declutching device comprising an hydraulic actuator, said actuator comprising a movable member and a fixed member mounting said movable member in piston and cylinder relationship therewith for movement of the movable member with respect to the fixed member between two end positions, said fixed and movable members defining a control chamber between them, the actuator defining preloading means between the fixed and movable members for permanently biassing said movable member toward one of said end positions, the device further comprising a valve for controlling supply of hydraulic fluid to said control chamber, the valve comprising a movable valve member having a first side and a second side opposed to the first side, means putting said first side into communication with the control chamber, and resilient means engaging said valve member on said second side thereof;

a body; means carried by said body and defining an inlet for hydraulic fluid; a bore in said body having a first end, a second end, and a middle portion between said ends thereof, said valve member being a slide valve, said bore mounting the slide valve for sealed sliding movement along the bore toward said first and second ends; a main duct in said body, said main duct comprising a first portion communicating with the inlet and a second portion, separate from said first portion, communicating with the control chamber, said first and second portions of the main duct being open into said middle portion of said bore and being separated from each other by said bore; a first branch duct in said body connecting said first end of the bore directly to the inlet; and a second branch duct connecting said second end of the bore directly to the control chamber, and wherein the valve member defines at least one transverse recess therein for putting the first and second portions of the main duct into communication with each other, with said resilient means being arranged at said first end of the bore to engage said second side of the valve member.

2. A declutching device according to claim 1, wherein the valve member defines two recesses spaced apart from each other.

3. A declutching device according to claim 2, wherein each said recess of the valve member is a peripheral annular groove.

4. A declutching device according to claim 1, further including a third branch duct connecting the control chamber directly to said inlet, and a non-return valve in said third branch duct.

5. A declutching device according to claim 1, wherein said body of the valve is incorporated in said fixed member of the hydraulic actuator.

* * * * *